US009835180B2

(12) United States Patent
Takahashi et al.

(10) Patent No.: US 9,835,180 B2
(45) Date of Patent: Dec. 5, 2017

(54) HYDRAULIC DRIVE SYSTEM FOR CONSTRUCTION MACHINE

(71) Applicant: Hitachi Construction Machinery Tierra Co., Ltd., Koka-shi, Shiga (JP)

(72) Inventors: Kiwamu Takahashi, Koka (JP); Shingo Kishimoto, Koka (JP); Yoshifumi Takebayashi, Koka (JP); Kazushige Mori, Koka (JP); Natsuki Nakamura, Koka (JP)

(73) Assignee: Hitachi Construction Machinery Tierra Co., Ltd, Koka-shi (JP)

( * ) Notice: Subject to any disclaimer, the term of this patent is extended or adjusted under 35 U.S.C. 154(b) by 210 days.

(21) Appl. No.: 14/763,000

(22) PCT Filed: Nov. 15, 2013

(86) PCT No.: PCT/JP2013/080929
§ 371 (c)(1),
(2) Date: Jul. 23, 2015

(87) PCT Pub. No.: WO2014/115407
PCT Pub. Date: Jul. 31, 2014

(65) Prior Publication Data

US 2015/0330415 A1 Nov. 19, 2015

(30) Foreign Application Priority Data

Jan. 25, 2013 (JP) ................................ 2013-012665

(51) Int. Cl.
*F16D 31/02* (2006.01)
*F15B 11/16* (2006.01)
(Continued)

(52) U.S. Cl.
CPC .......... *F15B 11/165* (2013.01); *E02F 9/2232* (2013.01); *E02F 9/2253* (2013.01);
(Continued)

(58) Field of Classification Search
CPC ...... F15B 11/163; F15B 11/165; F15B 11/168
(Continued)

(56) References Cited

U.S. PATENT DOCUMENTS 3,500,633 A * 3/1970 Livezey ................ F16H 61/427
60/422
6,105,367 A * 8/2000 Tsuruga ................ F15B 11/165
60/422

(Continued)

FOREIGN PATENT DOCUMENTS

JP 07-076863 A 3/1995
JP 2011-173302 A 9/2011
JP 2011-247301 A 12/2011

OTHER PUBLICATIONS

International Search Report dated Dec. 17, 2013 with English Translation (two (2) pages).

(Continued)

*Primary Examiner* — Michael Leslie
(74) *Attorney, Agent, or Firm* — Crowell & Moring LLP

(57) ABSTRACT

An object of the invention is to achieve a travel speed known in the art during travelling operation, improve energy efficiency by reducing energy loss, and obtain favorable travel operability less susceptible to effects from variations in a travel load and changes in a pump delivery pressure when travelling operation is performed through operation of a travel lever over a half stroke range or less. A variable restrictor valve 80 is disposed in parallel with a flow sensing valve 50 of an engine speed sensing valve unit 13. A travel pilot pressure is adapted to act in an opening direction of the variable restrictor valve 80. The variable restrictor valve 80 is set to have a continuously increasing opening area from a full closure to a maximum with an increasing travel pilot pressure. Travel flow control valves **6*d* and 6*e*** have an opening area that allows a predetermined flow rate QT (Continued)

required for traveling to be obtained even when a target LS differential pressure is decreased to a second specified value Pa3 when the travel lever is fully operated. In a first half of a spool stroke, the travel flow control valves 6*d* and 6*e* have an opening area approximate to an opening area of comparative example 1.

2 Claims, 6 Drawing Sheets

(51) Int. Cl.
*F15B 13/02* (2006.01)
*E02F 9/22* (2006.01)

(52) U.S. Cl.
CPC .......... *E02F 9/2285* (2013.01); *E02F 9/2296* (2013.01); *F15B 11/163* (2013.01); *F15B 11/168* (2013.01); *F15B 13/026* (2013.01); *F15B 2211/20553* (2013.01); *F15B 2211/253* (2013.01); *F15B 2211/30535* (2013.01); *F15B 2211/329* (2013.01); *F15B 2211/40515* (2013.01); *F15B 2211/428* (2013.01); *F15B 2211/50536* (2013.01); *F15B 2211/6058* (2013.01); *F15B 2211/6355* (2013.01); *F15B 2211/67* (2013.01); *F15B 2211/7135* (2013.01)

(58) Field of Classification Search
USPC .................................. 60/420, 422, 447, 449
See application file for complete search history.

(56) References Cited

U.S. PATENT DOCUMENTS

| | | | | |
|---|---|---|---|---|
| 6,688,102 | B2 * | 2/2004 | Oka | F16H 61/452 60/422 |
| 8,857,169 | B2 * | 10/2014 | Takahashi | F15B 11/165 60/422 |
| 9,200,431 | B2 * | 12/2015 | Mori | F15B 11/163 |
| 9,518,593 | B2 * | 12/2016 | Mori | F15B 11/168 |
| 2013/0055705 | A1 | 3/2013 | Mori et al. | |
| 2013/0287601 | A1 * | 10/2013 | Mori | F15B 11/165 417/364 |

OTHER PUBLICATIONS

International Preliminary Report of Patentability (PCT/IB/338 & PCT/IB/373) dated Aug. 6, 2015 (Two (2) pages).
English translation of Written Opinion (PCT/ISA/237) dated Dec. 17, 2013 (Three (3) pages).

* cited by examiner

HYDRAULIC DRIVE SYSTEM FOR CONSTRUCTION MACHINE

TECHNICAL FIELD

The present invention relates generally to a hydraulic drive system for construction machines, such as hydraulic excavators including travel hydraulic motors and variable displacement hydraulic pumps. More particularly, the present invention relates to a load sensing control hydraulic drive system that controls displacement of a hydraulic pump such that a delivery pressure of the hydraulic pump is higher than a maximum load pressure of a plurality of actuators by a predetermined value (a target differential pressure).

BACKGROUND ART

A hydraulic drive system of this type for a construction machine is disclosed in patent document 1. The hydraulic drive system disclosed in patent document 1 includes a travel detection unit and a setting change unit. The travel detection unit detects travelling operation in which a travel hydraulic motor is driven. On the basis of the detection result of the travel detection unit, the setting change unit sets a target differential pressure of load sensing control at a first specified value during any time other than the travelling operation and sets the target differential pressure of load sensing control at a second specified value smaller than the first specified value during the travelling operation. In addition, in response to the target differential pressure of load sensing control set to be smaller during the travelling operation, an opening area of a spool of a travel flow control valve is set to be greater than before over an entire spool stroke. This arrangement allows a flow rate required for traveling to be supplied to the travel hydraulic motor during the travelling operation, thereby achieving a travel speed as usual and reducing energy loss and improve energy efficiency.

In order to reduce the target differential pressure of load sensing control in accordance with reduction in engine speed thereby to improve fine operability during reduction in engine speed, the hydraulic drive system disclosed in patent document 1 is configured to introduce an output pressure from an engine speed sensing valve unit to a load sensing control section of a pump control unit, as the target differential pressure of load sensing control. The engine speed sensing valve unit includes a flow sensing valve and a differential pressure reducing valve. The flow sensing valve varies a differential pressure thereacross in accordance with a delivery flow rate of a pilot pump driven by the engine. The differential pressure reducing valve generates and outputs the differential pressure across the flow sensing valve as an absolute pressure.

In one embodiment (the embodiment of FIG. 8) of the hydraulic drive system disclosed in patent document 1, on the assumption that the system includes the engine speed sensing valve unit, a travel pilot pressure from a travel control lever unit is introduced to an open side end of the spool of the flow sensing valve. This causes the travel pilot pressure to act in a direction in which a variable restrictor of the flow sensing valve opens, thereby generating the target differential pressure of load sensing control as the second specified value.

PRIOR ART DOCUMENT

Patent Document

Patent Document 1: JP, A 2011-247301

SUMMARY OF THE INVENTION

Problem to be Solved by the Invention

In the hydraulic drive system disclosed in patent document 1, the target differential pressure of load sensing control is set at the second specified value smaller than the first specified value during the travelling operation and, in response to the setting of the smaller target differential pressure of load sensing control, the opening area of the spool of the travel flow control valve is set to be greater than usual over an entire spool stroke. This reduces energy loss and achieves improved energy efficiency in the travelling operation.

In the prior art, however, since the opening area of the spool of the travel flow control valve is set at a greater value than usual over the entire spool stroke, when the travel control lever is operated in the range of stroke less than a half to perform travelling operation, in particular upon travel fine operation, etc., the flow rate supplied from the hydraulic pump to the travel hydraulic motors are apt to be affected by variations in travelling load and changes in the pump delivery pressure, and this raises a problem to avoid favorable operability.

It is an object of the present invention to provide a hydraulic drive system for a construction machine in which a travel speed as usual is achieved and energy loss is reduced and energy efficiency is improved, while when the travel control lever is operated in the range of stroke less than a half to perform travelling operation, the flow rate supplied from the hydraulic pump to the travel hydraulic motors are hard to be affected by variations in travelling load and changes in the pump delivery pressure thereby to achieve favorable travel operability.

Means for Solving the Problem (1) To solve the foregoing problem, an aspect of the present invention provides a hydraulic drive system for a construction machine, the system comprising: a variable displacement main pump driven by a prime mover; a plurality of actuators including travel hydraulic motors and driven by a hydraulic fluid delivered from the main pump; a plurality of flow control valves including travel flow control valves, that controls flow rates of a hydraulic fluid supplied from the main pump to the plurality of actuators; a plurality of operating units including travel operating units, that instructs operating directions and operating speeds of the plurality of the actuators and outputs commands for operating the plurality of flow control valves; a plurality of pressure compensation valves for controlling differential pressures across the plurality of flow control valves; and a pump control unit for performing load sensing control of a displacement of the main pump such that a delivery pressure of the main pump becomes higher by a target differential pressure than a maximum load pressure of the actuators, the plurality of pressure compensation valves being configured to control the differential pressures across the respective flow control valves such that the differential pressure across each of the flow control valves is maintained at a differential pressure between the delivery pressure of the main pump and the maximum load pressure of the actuators, wherein the hydraulic drive system further comprises: a travel detection unit that detects travelling operation in which the travel hydraulic motors are driven; and a target differential pressure setting unit that, based on a result of detection by the travel detection unit, sets the target differential pressure of load sensing control at a first specified value at any time other than the travelling operation and sets the target differential pressure of load sensing control at a second specified value smaller than the first specified value during the travelling operation, wherein the travel flow control valves each has such an opening area characteristic that an opening area at a spool stroke when the corresponding travel operating unit is fully operated is large enough to obtain a predetermined flow rate required for traveling when the target differential pressure of load sensing control is set at the second specified value, and an opening area in a spool stroke range when the corresponding travel operating unit is finely operated is approximate to an opening area of a travel flow control valve having a maximum opening area that can obtain a predetermined flow rate required for traveling when the target differential pressure of load sensing control is set at the first specified value.

The travel flow control valve is set to have an opening area at the spool stroke when the travel operating unit is fully operated large enough to obtain the predetermined flow rate required for traveling even when the target differential pressure of load sensing control is the second specified value smaller than the first specified value. This arrangement enables a travel speed known in the art during travelling operation to be achieved and energy efficiency to be improved by reducing energy loss.

The favorable operability can be achieved in the following method. The opening area in the spool stroke range when the travel operating unit is finely operated is adapted to be approximate to the opening area of the travel flow control valve. The opening area has the maximum area where a predetermined flow rate required for traveling when the target differential pressure of load sensing control is the first specified value (the opening area on a smaller side) can be obtained. When the travel lever is operated in the stroke range over which the travel lever is operated halfway or less, including fine operation, to perform the travelling operation, the system will be less susceptible to effects from variations in a travel load and changes in a pump delivery pressure.

(2) Preferably, in (1) above, the target differential pressure setting unit comprises: a pilot pump driven by the prime mover; a prime mover speed sensing valve unit including: a flow sensing valve disposed in a line through which a hydraulic fluid delivered from the pilot pump flows, for varying a differential pressure across the flow sensing valve in accordance with a delivery flow rate of the pilot pump; and a differential pressure reducing valve that generates the differential pressure across the flow sensing valve as an absolute pressure and outputs the absolute pressure as the target differential pressure of load sensing control; and a variable restrictor valve disposed in parallel with the flow sensing valve in a line through which the hydraulic fluid delivered from the pilot pump flows, wherein the variable restrictor valve is in a fully closed position at any time other than the travelling operation and is in a restricting position during the travelling operation and continuously increases an opening area thereof from a full closure up to a maximum as an input amount of the travel operating unit increases from a minimum to a maximum.

The arrangements in which the variable restrictor valve is disposed in parallel with the flow sensing valve and in which the opening area of the variable restrictor valve increases continuously from the fully closed position to the maximum allow an output pressure of the differential pressure reducing valve (target differential pressure of load sensing control) to a minimum, the output pressure being at the time that the travel operating unit is fully operated to decrease at a rate identical to an input amount of the travel operating unit throughout an entire prime mover speed range from a maximum. For this reason, when the prime mover speed is reduced to a low speed to thereby finely operate the travel operating unit, the output pressure of the differential pressure reducing valve (target differential pressure of load sensing control) can be reduced in accordance with the input amount of the travel operating unit. Accordingly, the differential pressure across the travel flow control valve can be similarly reduced.

An operation in which the travel operating unit is finely operated (e.g., a finely operated downhill travelling operation) often involves reduction in the prime mover speed to a low speed. In the aspect of the present invention, the output pressure of the differential pressure reducing valve (target differential pressure of load sensing control) decreases at the rate identical to the input amount of the travel operating unit in the finely operated downhill travelling operation. The differential pressure across the travel flow control valve can be similarly reduced as a result.

When the prime mover speed is reduced to a low value to thereby perform fine operation in travel, the opening area of the travel flow control valve is made small as described in above (1) and the differential pressure across the travel flow control valve is made to decrease at the rate identical to the input amount of the travel operating unit. This enables a rate of flow supplied to the travel hydraulic motor to be finely adjusted in accordance with the input amount. This adjustment eliminates an excessive travel speed unexpected by an operator and significantly improves operability.

Advantageous Effects of the Invention

The present invention achieves a travel speed known in the art during travelling operation and improves energy efficiency by reducing energy loss while obtaining favorable operability less susceptible to effects from variations in a travel load and changes in a pump delivery pressure when travelling operation is performed through operation of a travel lever over a half stroke range or less.

When the prime mover speed is reduced to a low speed to thereby perform fine operation in travel, the present invention allows the rate of flow supplied to the travel hydraulic motor to be finely adjusted in accordance with the input amount, thus eliminating the likelihood that an excessive travel speed unexpected by the operator will be produced and significantly improving operability.

MODES FOR CARRYING OUT THE INVENTION

An embodiment of the present invention will be described below with reference to the accompanying drawings.

Configuration

Figure 1:
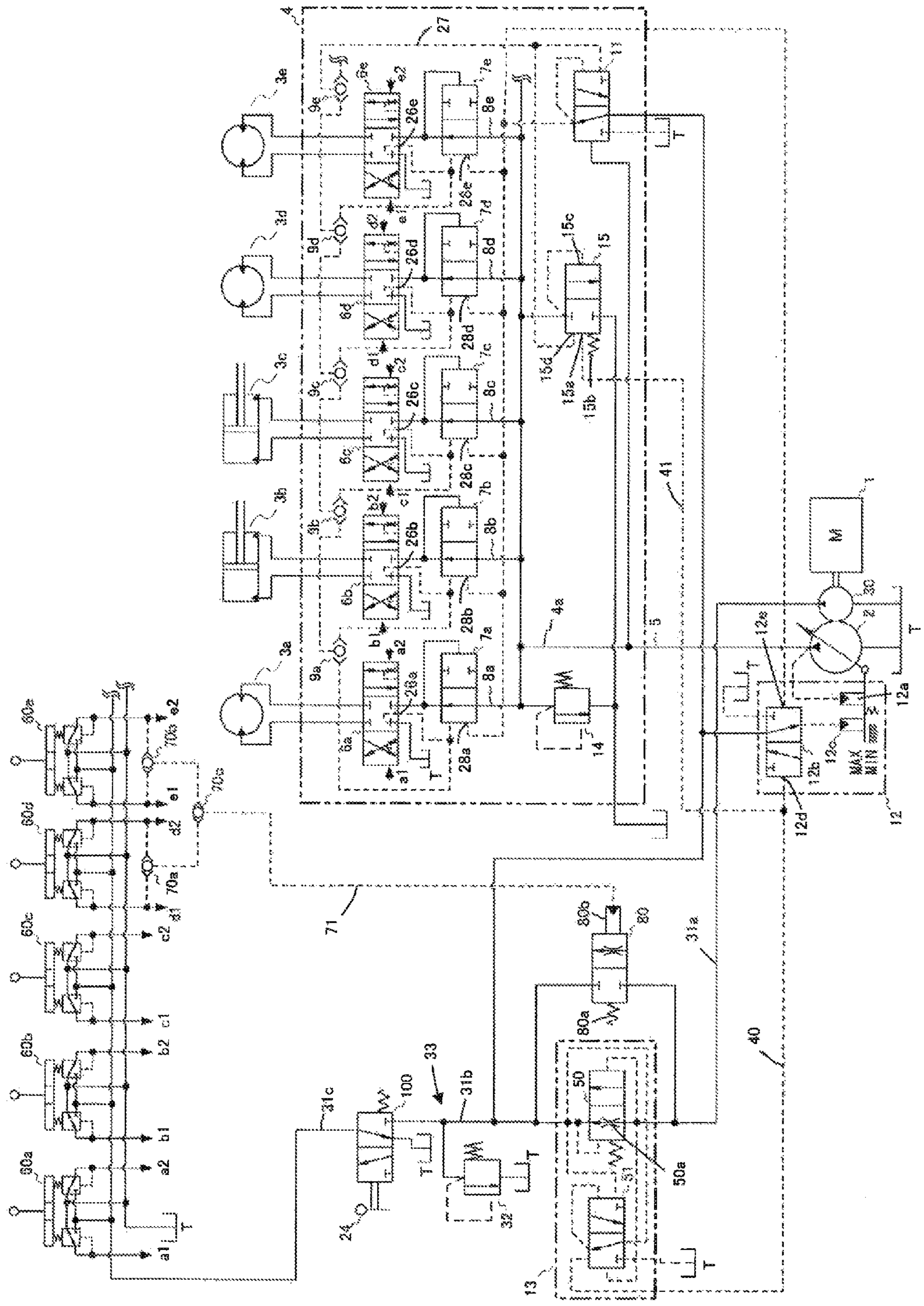
FIG. 1 is a diagram showing a configuration of a hydraulic drive system for a construction machine according to an embodiment of the present invention.

FIG. 1 is a diagram showing a configuration of a hydraulic drive system for a construction machine according to an embodiment of the present invention. The embodiment represents the present invention applied to a hydraulic drive system for a front swing type hydraulic excavator.

In FIG. 1, the hydraulic drive system according to the embodiment includes a diesel engine 1 (hereinafter referred to as an engine) serving as a prime mover, a variable displacement hydraulic pump 2 as a main pump (hereinafter referred to as a main pump), a fixed displacement pilot pump 30, a plurality of actuators 3*a*, 3*b*, 3*c*, 3*d*, 3*e*, . . . , a control valve 4, an engine speed sensing valve unit 13, a pilot hydraulic fluid source 33, a gate lock valve 100 serving as a safety valve, and control lever units 60*a*, 60*b*, 60*c*, 60*d*, 60*e* . . . . More specifically, the main pump 2 and the pilot pump 30 are driven by the engine 1. The actuators 3*a*, 3*b*, 3*c*, 3*d*, 3*e* . . . are driven by a hydraulic fluid delivered from the main pump 2. The control valve 4 is disposed between the main pump 2 and the actuators 3*a*, 3*b*, 3*c*, 3*d*, 3*e* . . . . The engine speed sensing valve unit 13 is connected to a hydraulic fluid supply line 31*a* of the pilot pump 30 and outputs an absolute pressure corresponding to a delivery flow rate of the pilot pump 30. The pilot hydraulic fluid source 33 includes a pilot relief valve 32 that is connected to a pilot hydraulic line 31*b* located downstream of the engine speed sensing valve unit 13 and maintains constant a hydraulic pressure in the pilot hydraulic line 31*b*. The gate lock valve 100 is connected to a downstream side of the pilot hydraulic fluid source 33 and operated by a gate lock lever 24. The control lever units 60*a*, 60*b*, 60*c*, 60*d*, 60*e* . . . are connected to a pilot hydraulic line 31*c* located downstream of the gate lock valve 100 and includes remote control valves that use a hydraulic pressure of the pilot hydraulic fluid source 33 as a primary pressure (source pressure) and generate pilot pressures (operating pilot pressures) a1, a2, b1, b2, c1, c2, d1, d2, e1, e2 . . . for operating flow control valves 6*a*, 6*b*, 6*c*, 6*d*, 6*e* . . . (to be described later) in the control valve 4.

The control valve 4 includes a second hydraulic fluid supply line 4*a* (internal path), a plurality of flow control valves 6*a*, 6*b*, 6*c*, 6*d*, 6*e* . . . , pressure compensation valves 7*a*, 7*b*, 7*c*, 7*d*, 7*e* . . . , shuttle valves 9*a*, 9*b*, 9*c*, 9*d*, 9*e* . . . , a differential pressure reducing valve 11, a main relief valve 14, and an unloading valve 15. More specifically, the second hydraulic fluid supply line 4*a* is connected to a first hydraulic fluid supply line 5 (piping) to which a delivered fluid from the main pump 2 is supplied. The flow control valves 6*a*, 6*b*, 6*c*, 6*d*, 6*e* . . . of a closed center type are each connected to a corresponding one of hydraulic lines 8*a*, 8*b*, 8*c*, 8*d*, 8*e* . . . that branch off from the second hydraulic fluid supply line 4*a*. The flow control valves 6*a*, 6*b*, 6*c*, 6*d*, 6*e* . . . each control a flow rate and a direction of a hydraulic fluid supplied from the main pump 2 to a corresponding one of the actuators 3*a*, 3*b*, 3*c*, 3*d*, 3*e* . . . . The pressure compensation valves 7*a*, 7*b*, 7*c*, 7*d*, 7*e* . . . are each disposed upstream of a corresponding one of the flow control valves 6*a*, 6*b*, 6*c*, 6*d*, 6*e* . . . . The pressure compensation valves 7*a*, 7*b*, 7*c*, 7*d*, 7*e* . . . each control a differential pressure across a meter-in restrictor of a corresponding one of the flow control valves 6*a*, 6*b*, 6*c*, 6*d*, 6*e* . . . . The shuttle valves 9*a*, 9*b*, 9*c*, 9*d*, 9*e* . . . each select the greatest pressure (maximum load pressure) of load pressures of actuators 3*a*, 3*b*, 3*c*, 3*d*, 3*e* . . . and output the greatest pressure to a signal hydraulic line 27. The differential pressure reducing valve 11 receives the pressure of the second hydraulic fluid supply line 4*a* (the delivery pressure of the main pump 2) and the pressure of the signal hydraulic line 27 (the maximum load pressure) introduced thereto and outputs as an absolute pressure PLS a differential pressure between the main pump 2 delivery pressure (pump pressure) and the maximum load pressure. The main relief valve 14 is connected to the second hydraulic fluid supply line 4*a*. When the pressure of the second hydraulic fluid supply line 4*a* (the main pump 2 delivery pressure) becomes greater than or equal to a set pressure, the main relief valve 14 opens to return the hydraulic fluid of the second hydraulic fluid supply line 4*a* to a tank T, thereby preventing the pressure of the second hydraulic fluid supply line 4*a* (the main pump 2 delivery pressure) from exceeding the set pressure. The unloading valve 15 is connected to the second hydraulic fluid supply line 4*a*. When the main pump 2 delivery pressure becomes greater than the maximum load pressure to which a set pressure of a pressure receiving portion 15*a* and a spring 15*b* is added, the unloading valve 15 opens to return the main pump 2 delivered fluid back to the tank T, thereby preventing the main pump 2 delivery pressure from building up relative to the maximum load pressure.

The flow control valves 6*a*, 6*b*, 6*c*, 6*d*, 6*e* . . . have load ports 26*a*, 26*b*, 26*c*, 26*d*, 26*e* . . . , respectively. When the flow control valves 6*a*, 6*b*, 6*c*, 6*d*, 6*e* . . . are each in a neutral position, the load ports 26*a*, 26*b*, 26*c*, 26*d*, 26*e* . . . each communicate with the tank T to thereby output a tank pressure as a load pressure. When the flow control valves 6*a*, 6*b*, 6*c*, 6*d*, 6*e* . . . are each placed in the right or left operated position shown in FIG. 1 from the neutral position, the load ports 26*a*, 26*b*, 26*c*, 26*d*, 26*e* . . . each communicate with a corresponding one of the actuators 3*a*, 3*b*, 3*c*, 3*d*, 3*e* . . . , thereby outputting the corresponding load pressure of the actuators 3*a*, 3*b*, 3*c*, 3*d*, 3*e* . . . .

The shuttle valves 9*a*, 9*b*, 9*c*, 9*d*, 9*e* . . . are connected in a tournament format and, together with the load ports 26*a*, 26*b*, 26*c*, 26*d*, 26*e* . . . and the signal hydraulic line 27, constitute a maximum load pressure detection circuit. The shuttle valve 9*a* selects and outputs the higher pressure among a pressure at the load port 26*a* of the flow control valve 6*a* and another one at the load port 26*b* of the flow control valve 6*b*. The shuttle valve 9*b* selects and outputs the higher pressure among an output pressure from the shuttle valve 9*a* and a pressure at the load port 26*c* of the flow control valve 6*c*. The shuttle valve 9*c* selects and outputs the higher pressure among an output pressure from the shuttle valve 9*b* and a pressure at the load port 26*d* of the flow control valve 6*d*. The shuttle valve 9*d* selects and outputs the higher pressure among an output pressure from the shuttle valve 9*c* and a pressure at the load port 26*e* of the flow control valve 6*e*. The shuttle valve 9*e* selects and outputs the higher pressure among an output pressure from the shuttle valve 9*d* and an output pressure from a similar shuttle valve (not shown). The shuttle valve 9*e* is disposed at a last stage. The output pressure from the shuttle valve 9*e* serves as a maximum load pressure output to the signal hydraulic line 27 and introduced to the differential pressure reducing valve 11 and the unloading valve 15.

The pressure compensation valves 7*a*, 7*b*, 7*c*, 7*d*, 7*e* . . . respectively have valve opening-side pressure receiving portions 28*a*, 28*b*, 28*c*, 28*d*, 28*e* . . . for setting target differential pressures. An output pressure from the differential pressure reducing valve 11 is introduced to the pressure receiving portions 28*a*, 28*b*, 28*c*, 28*d*, 28*e* . . . . A target compensation differential pressure is set depending on the absolute pressure of the differential pressure between the hydraulic pump pressure and the maximum load pressure (hereinafter referred to as the absolute pressure PLS). Controlling to bring the differential pressures across the flow control valves 6*a*, 6*b*, 6*c*, 6*d*, 6*e* . . . to the same absolute pressure PLS value regulates the pressure compensation valves 7*a*, 7*b*, 7*c*, 7*d*, 7*e* . . . such that the differential pressures across the flow control valves 6*a*, 6*b*, 6*c*, 6*d*, 6*e* . . . equal the absolute pressure PLS. This control allows, during a combined operation that simultaneously drives multiple actuators, the delivery flow rate of the main pump 2 to be distributed in accordance with an opening area ratio of the flow control valves 6*a*, 6*b*, 6*c*, 6*d*, 6*e* . . . regardless of a magnitude of the load pressure of each of the actuators 3*a*, 3*b*, 3*c*, 3*d*, 3*e* . . . so as to achieve high combined operationality. When a saturation condition develops in which the main pump 2 delivers a short supply of delivery flow rate that falls short of a required flow rate, the absolute pressure PLS decreases in accordance with the degree of the short supply. The differential pressures across the flow control valves 6*a*, 6*b*, 6*c*, 6*d*, 6*e* . . . controlled by the pressure compensation valves 7*a*, 7*b*, 7*c*, 7*d*, 7*e* . . . are accordingly reduced at the same rate. Consequently, the flow rates of the flow control valves 6*a*, 6*b*, 6*c*, 6*d*, 6*e* . . . decrease at the same rate. In this case too, the delivery flow rate of the main pump 2 is distributed in accordance with the opening area ratio of the flow control valves 6*a*, 6*b*, 6*c*, 6*d*, 6*e* . . . so as to achieve high combined operationality.

The unloading valve 15 includes the pressure receiving portion 15*a*, the spring 15*b*, a pressure receiving portion 15*c*, and a pressure receiving portion 15*d*. Specifically, the pressure receiving portion 15*a* and the spring 15*b* are operative in a closing direction to establish a set pressure Pun0 for the unloading valve 15. The pressure receiving portion 15*c* is operative in an opening direction to receive the pressure of the second hydraulic fluid supply line 4*a* (the delivery pressure of the main pump 2) introduced thereto. The pressure receiving portion 15*d* is operative in a closing direction to receive the maximum load pressure detected by the shuttle valves 9*a*, 9*b*, 9*c*, 9*d*, 9*e* . . . introduced thereto via the signal hydraulic line 27. The pressure receiving portion 15*a* receives an output pressure Pa (to be described later) of a differential pressure reducing valve 51 of the engine speed sensing valve unit 13 introduced thereto via a hydraulic line 41. When the delivery pressure of the main pump 2 becomes higher than the sum of the maximum load pressure and the set pressure Pun0 of the pressure receiving portion 15*a* and the spring 15*a*, the unloading valve 15 opens to thereby return the hydraulic fluid of the main pump 2 to the tank T to thereby keep the delivery pressure of the main pump 2 below the sum of the maximum load pressure and the set pressure Pun0. When all control levers are in their neutral positions and the maximum load pressure detected by the shuttle valves 9*a*, 9*b*, 9*c*, 9*d*, 9*e* . . . is the tank pressure, the delivery pressure of the main pump 2 is controlled to the set pressure Pun0 of the unloading valve 15.

The actuators 3*a*, 3*b*, 3*c*, 3*d*, 3*e*) are, for example, a swing motor, a boom cylinder, an arm cylinder, a left track motor, and a right track motor, respectively, of the hydraulic excavator. The flow control valves 6*a*, 6*b*, 6*c*, 6*d*, 6*e*) are, for example, swing, boom, arm, left track, and right track flow control valves, respectively. For convenience' sake, a bucket cylinder, a swing cylinder, and other actuators and flow control valves relating to these actuators are not shown.

By operating the gate lock lever 24, the gate lock valve 100 is allowed to be switched between a position to connect the pilot hydraulic line 31*c* to the pilot hydraulic line 31*b* and a position to connect the pilot hydraulic line 31*c* to the tank T. When the gate lock valve 100 is placed in the position to connect the pilot hydraulic line 31*c* to the pilot hydraulic line 31*b* and any control lever of the control lever units 60*a*, 60*b*, 60*c*, 60*d*, 60*e* . . . is operated, the control lever unit generate an operating pilot pressure using the hydraulic pressure of the pilot hydraulic fluid source 33 as a primary pressure in accordance with an input amount of the control lever. When the gate lock valve 100 is placed in the position to connect the pilot hydraulic line 31*c* to the tank T, the control lever units 60*a*, 60*b*, 60*c*, 60*d*, 60*e* . . . are incapable of generating the operating pilot pressure even when the corresponding control lever is operated.

The engine speed sensing valve unit 13 includes a flow sensing valve 50 and the differential pressure reducing valve 51. Specifically, the flow sensing valve 50 is disposed between the hydraulic fluid supply line 31*a* and the pilot hydraulic line 31*b* of the pilot pump 30. The differential pressure reducing valve 51 outputs a differential pressure across the flow sensing valve 50 as an absolute pressure. The flow sensing valve 50 includes a variable restrictor 50*a* that increases an opening area with a rise in the flow rate of the flow sensing valve 50 (the delivery flow rate of the pilot pump 30). The hydraulic fluid of the pilot pump 30 flows past the variable restrictor 50*a* of the flow sensing valve 50 toward the side of the pilot hydraulic line 31*b*. At this time, a differential pressure that increases with an increasing flow rate is generated at the variable restrictor 50*a* of the flow sensing valve 50. The differential pressure reducing valve 51 outputs the differential pressure across the variable restrictor 50*a* as the absolute pressure Pa. The delivery flow rate of the pilot pump 30 varies with the speed of the engine 1. Thus, detecting the differential pressure across the variable restrictor 50*a* allows the delivery flow rate of the pilot pump 30 and the speed of the engine 1 to be detected. Additionally, the variable restrictor 50*a* increases the opening area with an increasing rate flow of the area (with an increasing differential pressure thereacross). The variable restrictor 50*a* exhibits characteristics of a mild increase in the differential pressure at increasing flow rate of the area.

The main pump 2 includes a pump control unit 12 for controlling a tilting angle (capacity or displacement volume). The pump control unit 12 includes a horsepower control tilting actuator 12*a*, an LS control valve 12*b*, and an LS control tilting actuator 12*c*.

When the delivery pressure of the main pump 2 increases, the horsepower control tilting actuator 12*a* reduces the tilting angle of the main pump 2 to thereby prevent input torque of the main pump 2 from exceeding predetermined maximum torque. The horsepower consumption of the main pump 2 can be limited and the engine 1 can be prevented from stalling due to overload accordingly.

The LS control valve 12*b* has pressure receiving portions 12*d* and 12*e* that face each other. The absolute pressure Pa (a first specified value) as an output pressure of the differential pressure reducing valve 51 of the engine speed sensing valve unit 13 is introduced via a hydraulic line 40 to the pressure receiving portion 12*d* serving as a target differential pressure of load sensing control (target LS differential pressure). The absolute pressure PLS serving as the output pressure of the differential pressure reducing valve 11 is introduced to the pressure receiving portion 12*e*. When the absolute pressure PLS becomes higher than the absolute pressure Pa (PLS>Pa), the pressure of the pilot hydraulic fluid source 33 is introduced to the LS control tilting actuator 12*c* to thereby reduce the tilting angle of the main pump 2. When the absolute pressure PLS becomes lower than the absolute pressure Pa (PLS<Pa), the LS control tilting actuator 12*c* is brought into communication with the tank T to thereby increase the tilting angle of the main pump 2. Consequently, the tilting angle of the main pump 2 is controlled such that the delivery pressure of the main pump 2 becomes higher by the absolute pressure Pa (target differential pressure) than the maximum load pressure. The LS control valve 12*b* and the LS control tilting actuator 12*c* constitute load sensing pump control means that controls tilting of the main pump 2 such that the delivery pressure of the main pump 2 becomes higher by the target differential pressure of load sensing control than the maximum load pressure of the actuators 3*a*, 3*b*, 3*c*, 3*d*, 3*e* . . . .

It is here noted that the absolute pressure Pa varies according to the engine speed. An actuator's speed in keeping with the engine speed can therefore be controlled in the following method: using the absolute pressure Pa as the target differential pressure of load sensing control to set the target compensation differential pressure of the pressure compensation valves 7*a*, 7*b*, 7*c*, 7*d*, 7*e* . . . in accordance with the absolute pressure PLS of the differential pressure between the delivery pressure of the main pump 2 and the maximum load pressure. As described earlier, the variable restrictor 50*a* of the flow sensing valve 50 of the engine speed sensing valve unit 13 has such a characteristic that the greater the flow rate of the flow sensing valve 50 becomes, the milder the increase in the differential pressure thereacross becomes. This characteristic leads to improvement in a saturation phenomenon in accordance with the engine speed and favorable operability can be achieved when the engine speed is set low.

The absolute pressure Pa (the first specified value), the output pressure of the differential pressure reducing valve 51 of the engine speed sensing valve unit 13, is introduced to the pressure receiving portion 12*d* as the target differential pressure of load sensing control (the target LS differential pressure). The same absolute pressure Pa is introduced to the pressure receiving portion 15*a* of the unloading valve 15. The pressure receiving portion 15*a* and the spring 15*b* together establish the set pressure for the unloading valve 15. Thus, the set pressure for the unloading valve 15 is set at a value higher by a set portion achieved by the spring 15*b* than the target LS differential pressure. Additionally, the set portion achieved by the spring 15*b* is such a value small enough to retain the unloading valve 15 in a closed position when pressure of the pressure receiving portion 15*d* equals the tank pressure before the engine 1 is started. This reduces engine load when the engine 1 is started, achieving high startability of the engine 1.

In addition, the hydraulic drive system according to the embodiment is characterized by including shuttle valves 70*a*, 70*b*, and 70*c* (travel detection unit) and a variable restrictor valve 80. Specifically, the shuttle valves 70*a*, 70*b*, and 70*c* are disposed at delivery ports of remote control valves 60*d*1, 60*d*2, 60*e*1, and 60*e*2 of the travel control lever units 60*d* and 60*e*. The shuttle valves 70*a*, 70*b*, and 70*c* are incorporated in a tournament format so as to detect, of the operating pilot pressures d1, d2, e1, and e2 generated by the remote control valves 60*d*1, 60*d*2, 60*e*1, and 60*e*2, the highest pressure to thereby output the highest pressure as a travel pilot pressure to a signal hydraulic line 71. The variable restrictor valve 80 is disposed in the hydraulic fluid supply line 31*a* and pilot hydraulic line 31*b*, through which the delivery fluid of the pilot pump 30 flows, in parallel with the flow sensing valve 50. The variable restrictor valve 80 includes a spring 80*a* and a pressure receiving portion 80*b*. The spring 80*a* acts in a closing direction. The pressure receiving portion 80*b* receives the travel pilot pressure output from the shuttle valves 70*a*, 70*b*, and 70*c* and introduced thereto via the signal hydraulic line 71 and acts in an opening direction.

Shuttle valves 37*a*, 37*b*, and 37*c* constitute a travel detection unit that detects travelling operation in which traveling motors 3*d* and 3*e* are driven. The travel pilot pressure detected by the shuttle valves 70*a*, 70*b*, and 70*c* corresponds to an input amount (operating stroke) of the travel control lever unit 60*d* or 60*e*.

Figure 2:
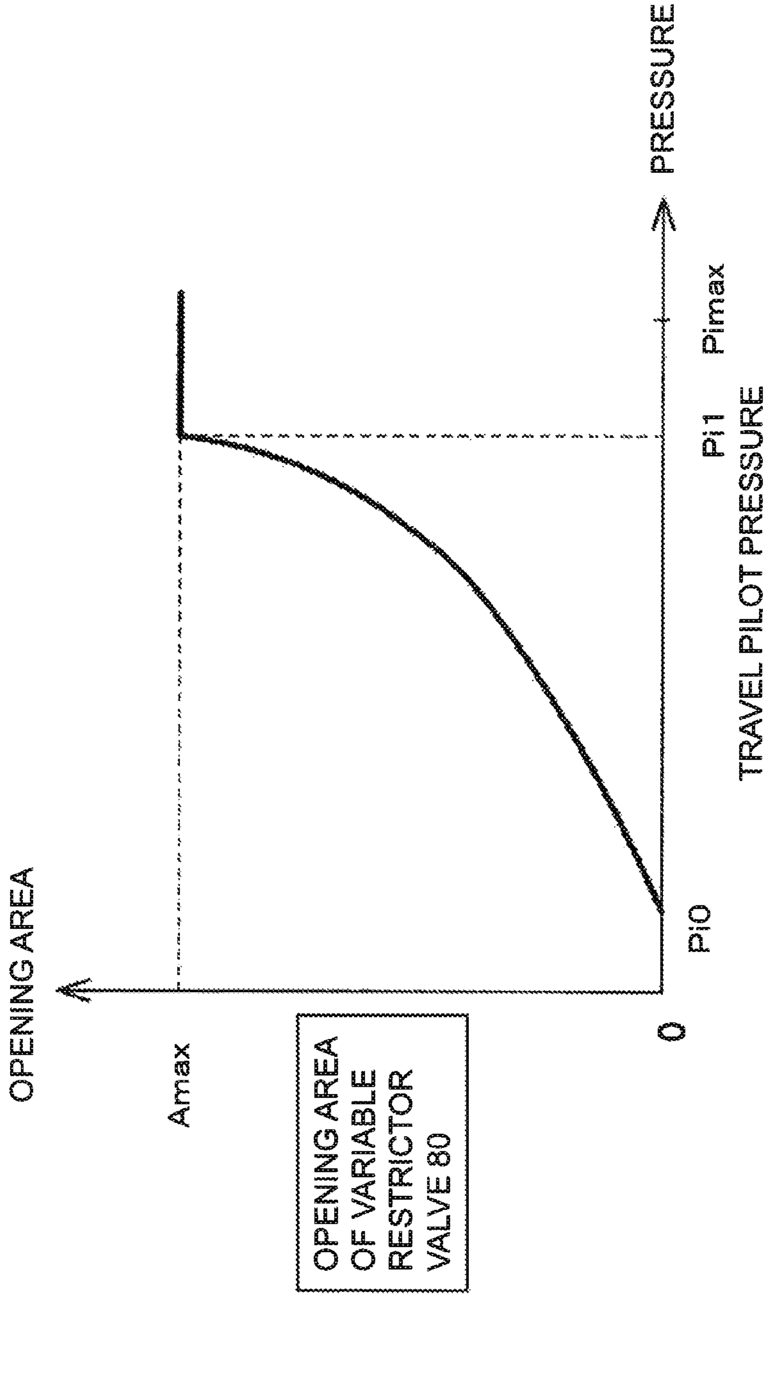
FIG. 2 is a graph showing characteristics of an opening area of a variable restrictor valve.

FIG. 2 is a graph showing an opening area characteristic of the variable restrictor valve 80. In FIG. 2, Pi0 denotes a travel pilot pressure at which the travel flow control valves 6*d* and 6*e* start opening, Pi1 denotes a travel pilot pressure at which the travel flow control valves 6*d* and 6*e* achieve a maximum opening area Abmax (see FIG. 4), and Pimax is a maximum travel pilot pressure. The variable restrictor valve 80 is set to offer opening area characteristics as follows. Specifically, the variable restrictor valve 80 is closed until the travel pilot pressure detected by the shuttle valves 70*a*, 70*b*, and 70*c* becomes Pi0; the variable restrictor valve 80 opens when the travel pilot pressure is higher than Pi0; thereafter, the variable restrictor valve 80 continuously increases its opening area with an increasing travel pilot pressure and, when the travel pilot pressure reaches Pi1, achieves a maximum opening area Amax. To state the foregoing differently, the variable restrictor valve 80 has such an opening area characteristic that the variable restrictor valve 80 is in a fully closed position at any time other than the travelling operation and, during the travelling operation, the variable restrictor valve 80 is in a restricting position and continuously increases its opening area from a full closure to the maximum as input amounts of the travel control lever units 60*d* and 60*e* increase from a minimum to a maximum.

Figure 3:
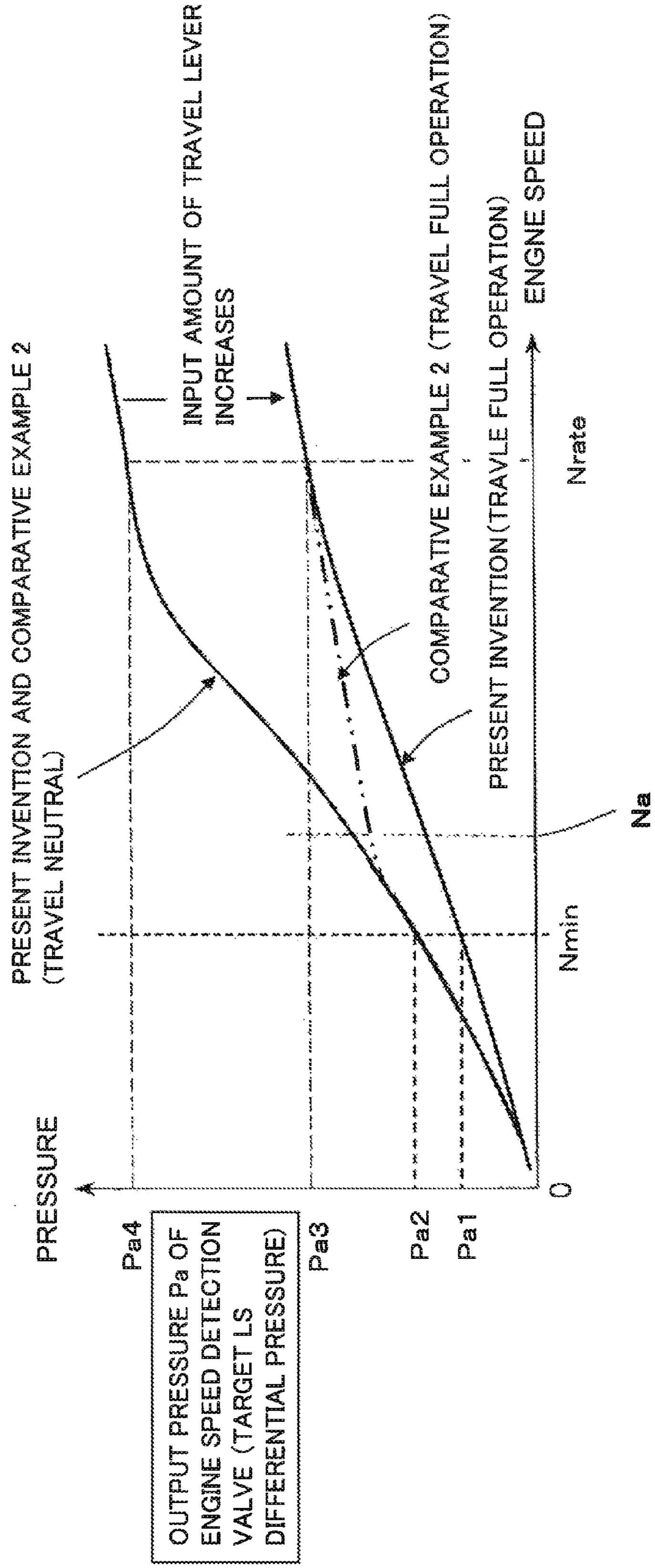
FIG. 3 is a graph showing changes, over an entire range of an engine speed (abscissa), in an absolute pressure (target LS differential pressure) as an output pressure of a differential pressure reducing valve of an engine speed sensing valve unit over an entire range when a control lever of a travel control lever unit is operated from a neutral position to a fully operated position.

FIG. 3 is a graph showing changes, over an entire range of an engine speed (abscissa), in the absolute pressure Pa (the target LS differential pressure) as the output pressure of the differential pressure reducing valve 51 of the engine speed sensing valve unit 13 over an entire range the engine speed (abscissa) when the control levers of the travel control lever units 60*d* and 60*e* (hereinafter referred to as travel levers) are operated from a neutral position to a fully operated position. In FIG. 3, Nmin denotes a low idle speed (minimum speed) and Nrate denotes a rated speed (maximum speed).

When the travel lever is operated from the neutral position to the fully operated position, the output pressure of the differential pressure reducing valve 51 (target LS differential pressure) is reduced by functioning of the variable restrictor valve 80 from a first specified value Pa4 to a second specified value Pa3. When the travel lever is in the neutral position, the output pressure of the differential pressure reducing valve 51 (target LS differential pressure) decreases from the first specified value Pa4 to Pa2 as the engine speed decreases from Nrate to Nmin. As the travel lever is operated with an increasing input amount, the output pressure of the differential pressure reducing valve 51 (target LS differential pressure) decreases at a ratio identical to the change in the input amount of the travel lever (travel pilot pressure) throughout the entire engine speed range. When the travel lever is fully operated, the output pressure of the differential pressure reducing valve 51 (target LS differential pressure) decreases from the second specified value Pa3 to Pa1 as the engine speed decreases from Nrate to Nmin. The arrangements in which the variable restrictor valve 80 is disposed in parallel with the flow sensing valve 50 and in which the opening area of the variable restrictor valve 80 increases continuously from the fully closed position to the maximum allow the output pressure of the differential pressure reducing valve 51 (target LS differential pressure), when the travel lever is fully operated, to decrease at the rate identical to the change in the input amount of the travel lever (travel pilot pressure) throughout the entire engine speed range from the maximum Nrate to the minimum Nmin (to state the foregoing differently, similarly decrease throughout the entire engine speed range). In FIG. 3, the dash-double-dot line indicates changes in the output pressure of the differential pressure reducing valve 51 when the travel lever is fully operated in comparative example 2 (to be described later).

Figure 4:
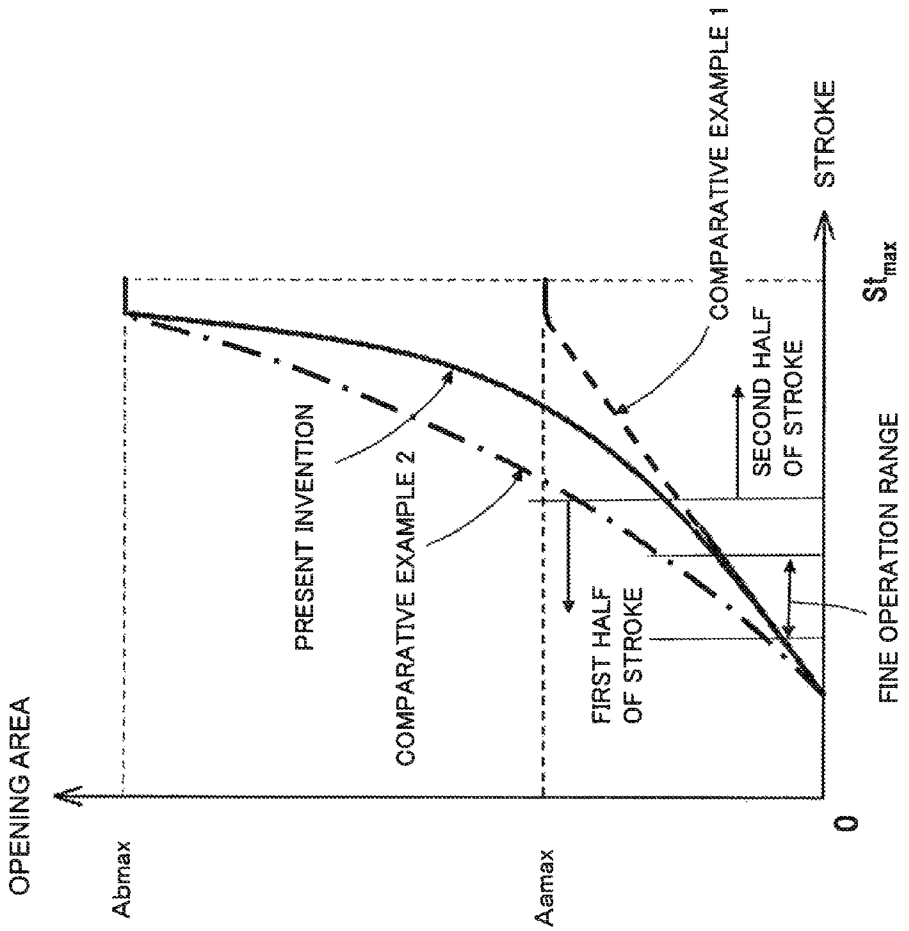
FIG. 4 is a graph showing characteristics of a meter-in opening area of a travel flow control valve that controls a flow rate of a hydraulic fluid supplied to a traveling motor.

FIG. 4 is a graph showing a meter-in opening area characteristic of the travel flow control valves 6*d* and 6*e* that control a flow rate of the hydraulic fluid supplied to the traveling motors 3*d* and 3*e*. In FIG. 4, the solid line indicates opening area characteristics of the flow control valves 6*d* and 6*e* in the embodiment; the broken line indicates an opening area characteristic of a travel flow control valve capable of supplying the traveling motors 3*d* and 3*e* with a predetermined flow rate QT required for traveling when the travel lever is fully operated in the hydraulic drive system of FIG. 1 including no variable restrictor valve 80 (comparative example 1); and the dash-single-dot line indicates an opening area characteristic of a travel flow control valve in the hydraulic system shown in FIG. 8 of patent document 1 in which a travel pilot pressure is directly introduced to a flow sensing valve 50 of an engine speed sensing valve 13. The "predetermined flow rate QT required for traveling", as used herein, refers to a flow rate with which the designed maximum travel speed can be obtained when the travel lever is fully operated.

The travel lever of comparative example 1 has an opening area of Aamax at a spool stroke of Stmax when the travel lever is fully operated. Because comparative example 1 includes no variable restrictor valve 80, Aamax represents the opening area of the travel flow control valve capable of supplying the traveling motors 3*d* and 3*e* with the predetermined flow rate QT required for traveling when the output pressure of the differential pressure reducing valve 51 (target LS differential pressure) is the first specified value Pa4 (see FIG. 3). Additionally, in comparative example 1, the opening area increases at a constant rate through the entire spool stroke when the spool stroke is varied from its minimum to its maximum.

The travel lever of comparative example 2 has an opening area of Abmax at a spool stroke of Stmax when the travel lever is fully operated. Abmax represents the opening area of the travel flow control valve capable of supplying the traveling motors 3*d* and 3*e* with the predetermined flow rate QT required for traveling even when the output pressure of the differential pressure reducing valve 51 (target LS differential pressure) is decreased to the second specified value Pa3 (see FIG. 3). Abmax also represents the opening area that allows a flow rate equivalent to a flow rate to be obtained in comparative example 1 when the output pressure of the differential pressure reducing valve 51 (target LS differential pressure) is the first specified value Pa4 (see FIG. 3). Additionally, in the travel flow control valve of comparative example 2, the output pressure of the differential pressure reducing valve 51 (target LS differential pressure) decreases with an increasing input amount of the travel lever. Thus, the opening area characteristic is set so that the opening area is greater than the opening area of comparative example 1 throughout the entire spool stroke in line with the decrease in the output pressure of the differential pressure reducing valve 51 (target LS differential pressure).

With the travel flow control valves 6*d* and 6*e* in the embodiment, the opening area at the spool stroke Stmax when the travel lever is fully operated is, as in comparative example 2, Abmax (which is large enough to obtain the predetermined flow rate QT required for traveling even when the output pressure of the differential pressure reducing valve 51 [target LS differential pressure] is decreased to the second specified value Pa3 [see FIG. 3]). In addition, the travel flow control valves 6*d* and 6*e* in the embodiment are set to offer the following opening area characteristics. Specifically, the travel flow control valves 6*d* and 6*e* have an opening area smaller than in comparative example 2 throughout the entire spool stroke when the spool stroke is varied from its minimum to its maximum. Furthermore, in a first half of the spool stroke including a spool stroke range when the travel lever is finely operated (the spool stroke range corresponding to a stroke range over which the travel lever is operated halfway or less), the travel flow control valves 6*d* and 6*e* have an opening area approximate to (substantially identical to) the opening area of comparative example 1 (the travel flow control valve having the maximum opening area Abmax that can obtain the predetermined flow rate required for traveling when the output pressure of the differential pressure reducing valve 51 (target LS differential pressure) is the first specified value Pa4). In a second half of the spool stroke (the spool stroke range corresponding to a stroke range over which the travel lever is operated more than halfway), the travel flow control valves 6*d* and 6*e* have an opening area that is greater than in comparative example 1 and that increases at a rate more than in comparative example 1 with an increasing spool stroke (the opening area increases at an increasing rate with an increasing spool stroke).

The expressions "opening area approximate to" or "opening area substantially identical to" in the first half of the spool stroke, as used herein, refers to a condition in which the opening area is identical to that in comparative example 1 or differs from that in comparative example 1 by 15% or less, but preferably by 10% or less. In addition, the opening area characteristic in the first half of the spool stroke may be defined as being different by 15% or less from a characteristic represented by a straight line connecting between an opening start and an opening area Aamax in the spool stroke range of ⅓ of the maximum stroke Stmax.

Figure 5:
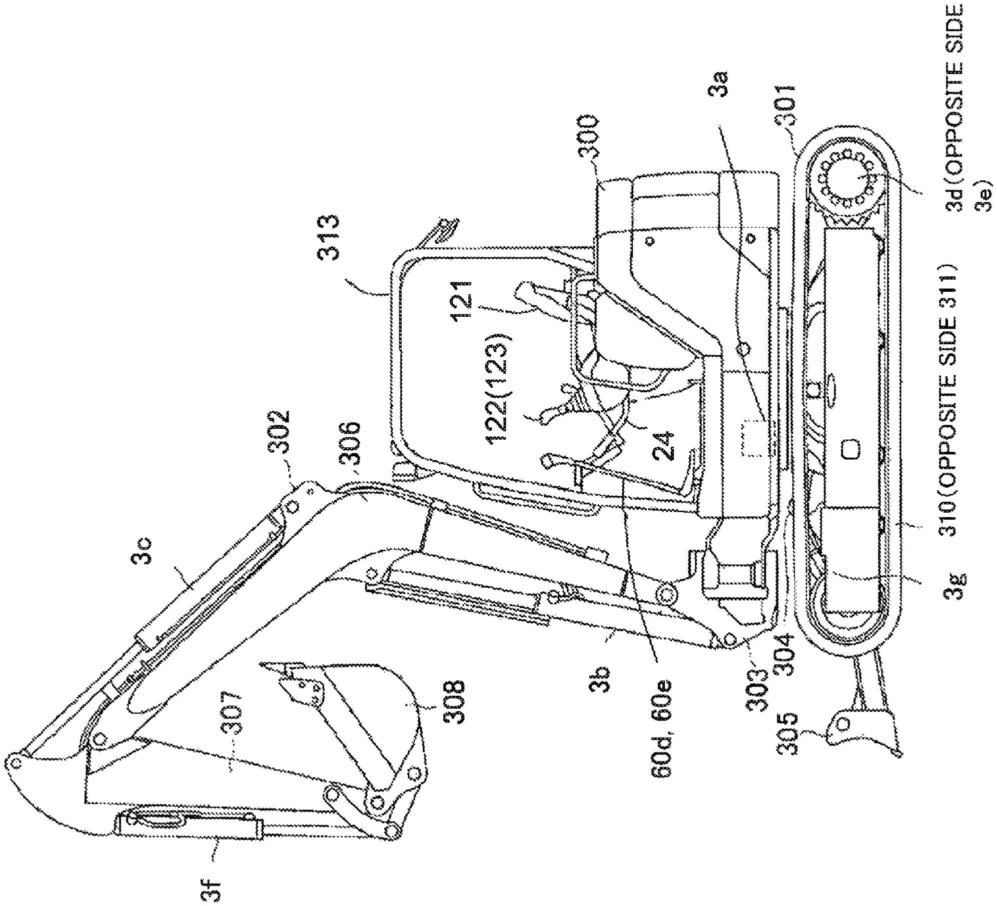
FIG. 5 is an illustration showing an appearance of a hydraulic excavator on which the hydraulic drive system according to the embodiment is mounted.

FIG. 5 is an illustration showing an appearance of a hydraulic excavator on which the hydraulic drive system according to the embodiment is mounted.

In FIG. 5, the hydraulic excavator well known as a work machine includes an upper swing structure 300, a lower track structure 301, and a swing type front work implement 302. The front work implement 302 includes a boom 306, an arm 307, and a bucket 308. The upper swing structure 300 is rotatably driven with respect to the lower track structure 301 by a swing motor 3*a*. A swing post 303 is disposed at a front portion of the upper swing structure 300. The front work implement 302 is vertically movably mounted on the swing post 303. The swing post 303 is rotatable in the horizontal direction relative to the upper swing structure 300 through expansion and contraction of a swing cylinder (not shown). The boom 306, the arm 307, and the bucket 308 of the front work implement 302 are rotatable in the vertical direction through expansion and contraction of a boom cylinder 3*b*, an arm cylinder 3*c*, and a bucket cylinder 3*f*. The lower track structure 301 includes a center frame. The center frame includes a blade 305 that is moved up and down through expansion and contraction of a blade cylinder 3*g*. The lower track structure 301 travels by driving left and right crawlers 310 and 311 driven through rotation of the traveling motors 3*d* and 3*e*.

The upper swing structure 300 includes a cabin (operator chamber) 313. The cabin 313 includes an operator seat 121, left and right control lever units 122 and 123 for front implement/swing (FIG. 5 shows only the left control lever unit), travel control lever units 60*d* and 60*e*, and a gate lock lever 24. The control lever units 122 and 123 are each operable from a neutral position in any direction with reference to two directions of the cross. When the left control lever unit 122 is operated in the forward and backward directions, the control lever unit 122 functions as the control lever unit 60*a* for swing. When the control lever unit 122 is operated in the right and left lateral directions, the control lever unit 122 functions as the control lever unit 60*c* for arm. When the right control lever unit 123 is operated in the forward and backward directions, the control lever unit 123 functions as the control lever unit 60*b* for boom.

Operation

Figure 6:
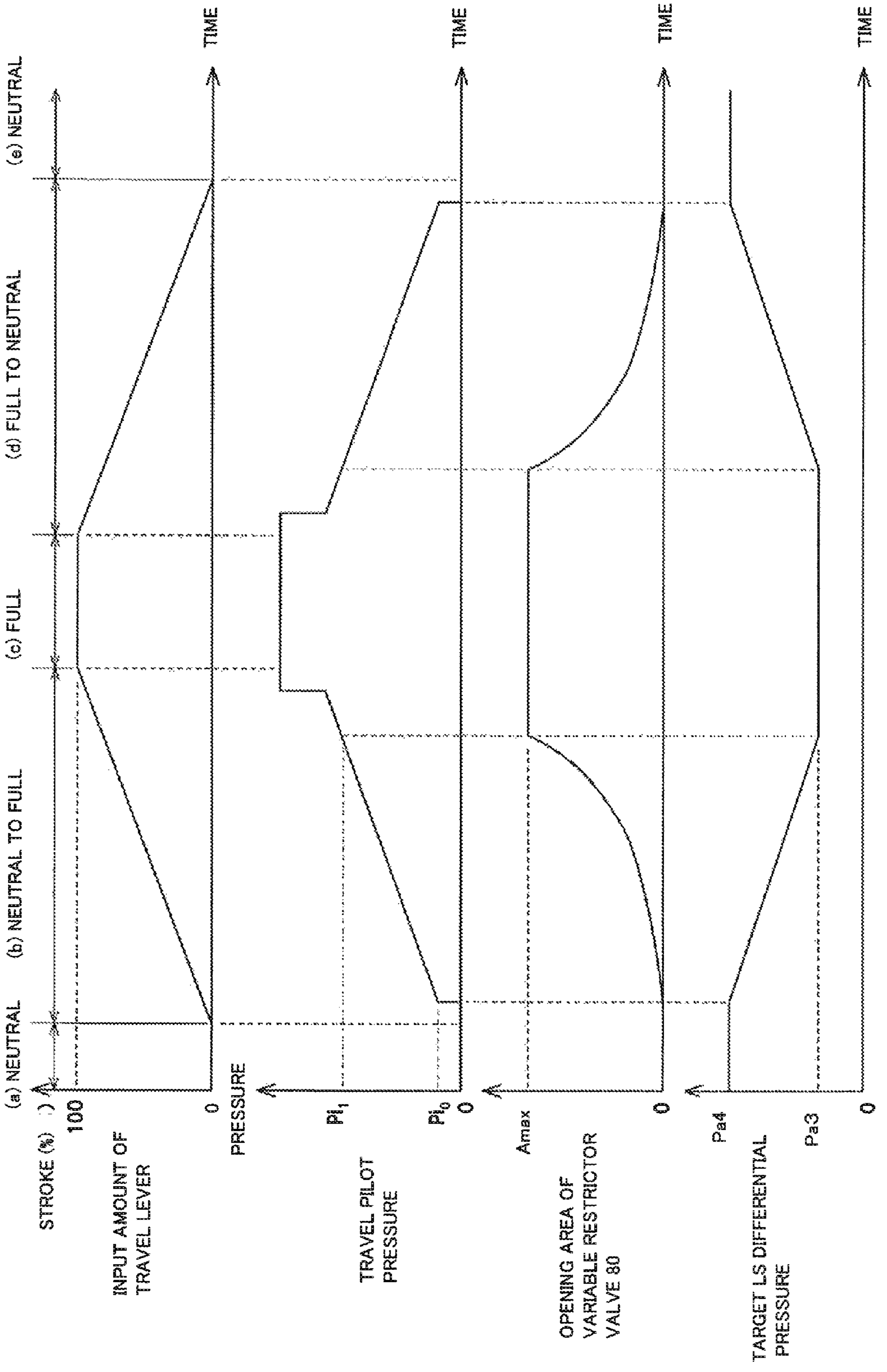
FIG. 6 is a time chart showing changes in a lever input amount, a travel pilot pressure, an opening area of the variable restrictor valve, and the output pressure of the differential pressure reducing valve of the engine speed sensing valve unit (target LS differential pressure) when the travel lever is operated.

Operation of the embodiment will be described with reference to FIG. 6. FIG. 6 is a time chart showing changes in the lever input amount, the travel pilot pressure, the opening area of the variable restrictor valve 80, and the output pressure of the differential pressure reducing valve 51 (target LS differential pressure), when the travel lever is operated.

(a) All control levers including the travel levers are in their neutral position:

When all control levers of the control lever units 60*a*, 60*b*, 60*c*, 60*d*, 60*e* . . . are in their neutral positions, the travel levers are also in the neutral position so that the travel pilot pressure detected by the shuttle valves 70*a*, 70*b*, and 70*c* is the tank pressure. For this reason, the tank pressure is introduced to the pressure receiving portion 80*b* of the variable restrictor valve 80, making the variable restrictor valve 80 maintained in the fully closed position by the spring 80*a*.

Because the variable restrictor valve 80 is in the fully closed position, the differential pressure reducing valve 51 of the engine speed sensing valve unit 13 outputs the absolute pressure Pa4 in accordance with the flow rate delivered from the pilot pump 30 (engine speed) as usual when the engine speed is the rated Nrate. The absolute pressure Pa4 is introduced to the pressure receiving portion 12*d* of the LS control valve 12*b* as the first specified value of the target LS differential pressure.

When all the control levers are in their neutral positions, all of the flow control valves 6*a*, 6*b*, 6*c*, 6*d*, 6*e* . . . are in their neutral positions as well. Thus, no hydraulic fluid is supplied to the actuators 3*a*, 3*b*, 3*c*, 3*d*, 3*e* . . . and the maximum load pressure detected by the shuttle valves 9*a*, 9*b*, 9*c*, 9*d*, 9*e* . . . is the tank pressure. The delivery pressure of the main pump 2 is consequently maintained at the minimum pressure corresponding to the set pressure of the unloading valve 15. Additionally, the output pressure of the differential pressure reducing valve 11 introduced to the pressure receiving portion 12*e* of the LS control valve 12*b* is the delivery pressure of the main pump 2 (pressure corresponding to the set pressure of the unloading valve 15) and the set pressure of the unloading valve 15 is higher than the output pressure of the differential pressure reducing valve 51 introduced to the pressure receiving portion 12*e* of the LS control valve 12*b*. Thus, the delivery flow rate of the main pump 2 is maintained at the minimum flow rate by the function of the LS control valve 12*b*.

(b) The travel levers are operated (b1) When the travel levers are operated gradually from the neutral position to the full stroke position The following describes a case in which the control levers of the travel control lever units 60*d* and 60*e* are operated gradually from the neutral position to the full stroke position.

When the travel levers are operated gradually from the neutral position to the full stroke position, the travel pilot pressure is detected by the shuttle valves 70*a*, 70*b*, and 70*c* and introduced to the pressure receiving portion 80*b* of the variable restrictor valve 80. As described earlier with reference to FIG. 2, the variable restrictor valve 80 has an opening area characteristic set such that the variable restrictor valve 80 opens when the travel pilot pressure exceeds Pi0 and, thereafter, increases its opening area with an increasing travel pilot pressure until the opening area reaches the maximum opening area Amax as the travel pilot pressure reaches Pi1. For this reason, the rate of flow passing through the variable restrictor valve 80 increases and that through the flow sensing valve 50 of the engine speed sensing valve unit 13 connected in parallel with the variable restrictor valve 80 decreases with an increasing travel pilot pressure. This results in a lower differential pressure across the flow sensing valve 50. When the engine speed is the rated Nrate, the output pressure of the differential pressure reducing valve 51 (target LS differential pressure) gradually decreases from Pa4 (the first specified value) to Pa3 (the second specified value) at a rate identical to the change in the travel pilot pressure as the travel pilot pressure increases.

The reduced differential pressure across the flow sensing valve 50 causes the delivery pressure of the pilot pump 30 disposed upstream of the flow sensing valve 50 to be smaller by the amount of its reduction.

By contrast, when the control levers of the travel control lever units 60*d* and 60*e* are operated in the left direction shown in FIG. 1 with an operator's intention to travel in a forward direction, the travel pilot pressures d1 and e1 are generated. The flow control valves 6*d* and 6*e* are then placed in the left position shown in FIG. 1 so that the delivery fluid of the main pump 2 is supplied to the left and right traveling motors 3*d* and 3*e*. At this time, the output pressure of the differential pressure reducing valve 51 is introduced as the target LS differential pressure to the pressure receiving portion 12*d* of the LS control valve 12*b*. The delivery flow rate of the main pump 2 is thus controlled such that the delivery pressure of the main pump 2 is higher than the load pressure of the boom cylinder 3*b* (maximum load pressure) by the target LS differential pressure and the left and right traveling motors 3*d* and 3*e* rotate in a forward direction.

A difference between the delivery pressure of the main pump 2 and the maximum load pressure is detected by the differential pressure reducing valve 11. The absolute pressure PLS that is the output pressure from the differential pressure reducing valve 11 is set in the pressure compensation valves 7*a* to 7*e* as the target compensation differential pressure. For these reasons, the differential pressure across each of the flow control valves 6*d* and 6*e* is controlled to be equal to the target LS differential pressure. As described earlier, the output pressure of the differential pressure reducing valve 51 (target LS differential pressure) gradually decreases from Pa4 (the first specified value) to Pa3 (the second specified value) as the travel pilot pressure increases. This causes the differential pressure across each of the flow control valves 6*d* and 6*e* to be decreased similarly.

(b2) When the travel levers are fully operated

When the travel levers are fully operated with the engine speed at the rated Nrate, the output pressure of the differential pressure reducing valve 51 (target LS differential pressure) decreases to the minimum pressure Pa3 (the second specified value) and the differential pressure across each of the flow control valves 6*d* and 6*e* is also reduced to the minimum pressure Pa3 (the second specified value).

As described earlier with reference to FIG. 4, the travel flow control valves 6*d* and 6*e* are set to offer the following opening area characteristics. Specifically, in the first half of the spool stroke, the travel flow control valves 6*d* and 6*e* have an opening area approximate to (substantially identical to) the opening area of comparative example 1. In the second half of the spool stroke, the travel flow control valves 6*d* and 6*e* have an opening area that is greater than in comparative example 1. At the spool stroke Stmax, the opening area is Abmax as in comparative example 2. Abmax is the opening area that allows the predetermined flow rate QT required for traveling to be supplied to the traveling motors 3*d* and 3*e* even when the output pressure of the differential pressure reducing valve 51 (target LS differential pressure) is decreased to Pa3 (the second specified value).

As described above, even when the travel levers are fully operated and the differential pressure across each of the flow control valves 6*d* and 6*e* is reduced to the minimum pressure Pa3 (the second specified value), the flow control valves 6*d* and 6*e* are set to have a large opening area accordingly. Thus, the traveling motors 3*d* and 3*e* can be supplied with the predetermined flow rate QT required for traveling.

On top of that, the differential pressure across each of the travel flow control valves 6*d* and 6*e* is reduced to the minimum pressure Pa3 (the second specified value). This reduces internal loss of the flow control valves 6*d* and 6*e* so that energy loss during travelling operation is improved.

(b3) When the travel levers are returned from the fully operated position to the neutral position In contrast to the case of (b1), the opening area of the variable restrictor valve 80 gradually decreases. Accordingly, when the engine speed is the rated Nrate, the output pressure of the differential pressure reducing valve 51 (target LS differential pressure) gradually increases from Pa3 (the second specified value) to Pa4 (the first specified value). The differential pressure across each of the flow control valves 6*d* and 6*e* increases similarly.

(b4) When the travel levers are operated in a stroke range over which the travel levers are operated halfway or less When the travel levers are operated in the stroke range over which the travel levers are operated halfway or less with the engine speed at the rated Nrate, the output pressure of the differential pressure reducing valve 51 (target LS differential pressure) decreases from the maximum pressure Pa4 (the first specified value) in accordance with the lever input amount. The differential pressure across each of the flow control valves 6*d* and 6*e* decreases accordingly. Meanwhile, the travel flow control valves 6*d* and 6*e* are set to offer the opening area characteristic in such a manner that: in the spool stroke range corresponding to the stroke range over which the travel levers are operated halfway or less, that is, the first half of the spool stroke, the travel flow control valves 6*d* and 6*e* have an opening area approximate to the opening area of comparative example 1. The opening area of the flow control valves 6*d* and 6*e* is therefore smaller than in comparative example 2. When the travelling operation is performed by operating the travel levers in the stroke range over which the travel levers are operated halfway or less, the rate of flow from the main pump 2 to the traveling motors 3*d* and 3*e* is less affected by variations in the travel load and changes in the pump delivery pressure. Favorable travel operability can thus be achieved.

As described earlier, arrangements are made in which the variable restrictor valve 80 is disposed in parallel with the flow sensing valve 50 and the opening area of the variable restrictor valve 80 increases continuously from the fully closed position to the maximum. Thus, as described earlier with reference to FIG. 3, when the travel levers are operated in the stroke range over which the travel levers are operated halfway or less with the engine speed reduced to a low speed, for example, Na (see FIG. 3), not only the opening area of the flow control valves 6*d* and 6*e* is reduced substantially as small as the opening area of comparative example 1, but also the output pressure of the differential pressure reducing valve (target LS differential pressure) is reduced at a rate identical to the change in the travel pilot pressure in accordance with the input amount of the travel levers. The differential pressure across each of the travel flow control valves 6*d* and 6*e* is thereby similarly reduced. This enables the rate of flow supplied to the traveling motors 3*d* and 3*e* to be finely adjusted in accordance with the input amount of the travel levers, thus substantially improving travel operability.

An exemplary type of operation performed in which the travel levers are operated in the stroke range over which the travel levers are operated halfway or less includes a finely operated downhill travelling operation. In a case where a hydraulic excavator is unloaded from the cargo deck of a truck or trailer for hauling a hydraulic excavator, two planks would be placed across one end of the cargo deck of the truck or trailer and the ground and the hydraulic excavator would be driven to move slowly along the planks to be unloaded from the cargo deck. In this operation, the operator would need to drive the hydraulic excavator slowly. In most cases the operator would reduce the engine speed to a range between the minimum (Nmin) and a medium speed, e.g., to low speed.

As described earlier with reference to FIG. 4, in comparative example 2, the travel flow control valves 6*d* and 6*e* are set to have the opening area characteristic that the opening area of the flow control valves 6*d* and 6*e* is greater throughout the entire spool stroke than in comparative example 1. The travel levers are operated in the stroke range over which the travel levers are operated halfway or less to thereby slowly drive the hydraulic excavator. At this time, the rate of flow supplied from the main pump 2 to the traveling motors 3*d* and 3*e* tends to be affected more readily by variations in the travel load and changes in the pump delivery pressure, resulting in low operability.

In comparative example 2, the output pressure of the differential pressure reducing valve 51 when the travel levers are fully operated changes as indicated by the dash-double-dot line in FIG. 3 when the engine speed is reduced from the maximum Nrate. Specifically, the output pressure of the differential pressure reducing valve 51 when the travel levers are fully operated changes over the engine speed range from Nrate to a low speed that falls within a range between Nmin and medium speed. At any engine speed below the foregoing engine speed range, the output pressure of the differential pressure reducing valve 51 changes little even when the travel levers are operated. When the engine speed is reduced to a speed that falls within the range between Nmin and medium speed, e.g., a low speed Na, fully operating the travel levers does reduce the output pressure of the differential pressure reducing valve 51, but the reduction represents only a slight amount; and finely operating the travel levers can be said to change the output pressure of the differential pressure reducing valve 51 little. This is because, in comparative example 2, the travel pilot pressure is directly introduced to the flow sensing valve 50 of the engine speed sensing valve unit 13.

In comparative example 2, in order to unload the hydraulic excavator from the cargo deck of the hydraulic excavator-hauling truck or trailer, the engine speed may be reduced to a speed that falls within the Nmin-to-medium speed range and the travel levers may then be operated. In this case, the opening area of the flow control valves 6*d* and 6*e* is greater than in comparative example 1 to be on the open side; moreover, the output pressure of the differential pressure reducing valve 51 (target LS differential pressure) is substantially identical to that when the travel levers are not operated as indicated by, for example, the low speed Na in FIG. 3. This results in an increased rate of flow supplied to the traveling motors 3*d* and 3*e* and thus in an increased likelihood that the travel speed will be greater than the operator expected, leading to impaired operability.

By contrast, in the present embodiment, as described with reference to FIG. 4, the travel flow control valves 6*d* and 6*e* are set to offer the opening area characteristic in such a manner that: the opening area of the flow control valves 6*d* and 6*e* is smaller than in comparative example 2; and, in the first half of the spool stroke including the spool stroke range over which the travel lever is finely operated, the travel flow control valves 6*d* and 6*e* have an opening area approximate to the opening area of comparative example 1. Thus, when the hydraulic excavator is driven to travel slowly by operating the travel levers in the stroke range over which the travel levers are operated halfway or less, the rate of flow from the main pump 2 to the traveling motors 3*d* and 3*e* is less affected by variations in the travel load and changes in the pump delivery pressure. Favorable travel operability can be therefore achieved.

Additionally, in the present embodiment, the output pressure of the differential pressure reducing valve 51 when the travel levers are fully operated with the engine speed reduced to a speed that falls within the range between Nmin and medium speed, e.g., the low speed Na, is reduced at the rate identical to the change in the travel pilot pressure. If the travel levers are finely operated, the output pressure of the differential pressure reducing valve 51 is reduced according to the input amount of the travel levers.

The engine speed is reduced to a low speed that falls within the Nmin-to-medium speed range. The travel levers are then finely operated in order to unload the hydraulic excavator from the cargo deck of the hydraulic excavator-hauling truck or trailer. Therefore, the rate of flow supplied to the traveling motors 3*d* and 3*e* can be finely adjusted in accordance with the input amount of the travel levers. This eliminates the likelihood that an excessive travel speed unexpected by the operator will be produced, thus significantly improving the operability.

(c) Control levers other than those for travel are operated

When the control levers of the control lever units 60*a*, 60*b*, 60*c* . . . other than those for travel are operated, since the travel levers are placed in their neutral positions, the output pressure of the differential pressure reducing valve 51 of the engine speed sensing valve unit 13 is Pa4 (the first specified value). This Pa4 is introduced as the target LS differential pressure to the pressure receiving portion 12*d* of the LS control valve 12*b* when the engine speed is the rated Nrate as in the case of (a) described above.

When the control lever of the boom control lever unit 60*b* is operated in the left direction shown in FIG. 1 for boom raising, for example, the operating pilot pressure b1 is generated to thereby place the flow control valve 6*b* in the left position shown in FIG. 1. The delivery fluid from the main pump 2 is consequently supplied to a bottom side of the boom cylinder 3*b*. Because of the output pressure Pa4 of the differential pressure reducing valve 51 being introduced as the target LS differential pressure to the pressure receiving portion 12*d* of the LS control valve 12*b*, at this time, the delivery flow rate of the main pump 2 is controlled so that the delivery pressure of the main pump 2 is higher by Pa4 than the load pressure of the boom cylinder 3*b* (maximum load pressure). The boom cylinder 3*b* is then driven to its extending direction.

A condition in which the delivery flow rate of the main pump 2 is in short supply (saturation) can occur when a plurality of control levers is operated to intend combined operations for simultaneously driving a plurality of actuators in any operations other than causing the hydraulic excavator to travel, such as in combined operations of boom raising and arm crowding. In this case, the delivery pressure of the main pump 2 decreases to a level lower than the target LS differential pressure (Pa4) and the absolute pressure PLS as the output pressure of the differential pressure reducing valve 11 becomes lower than the target LS differential pressure (absolute pressure PLS<Pa4). Reductions in the target compensation differential pressures as a result of the foregoing reduction in the absolute pressure PLS occur in all pressure compensation valves relating to the combined operations (e.g., the boom pressure compensation valve 7*b* and the arm pressure compensation valve 7*c*). A flow rate ratio in keeping with an opening area ratio of a plurality of flow control valves (e.g., the boom flow control valve 6*b* and the arm flow control valve 6*c*) is thus maintained, which enables smooth combined operations in accordance with the ratios of the lever input amounts of the control lever units.

Advantageous Effects

As described heretofore, in the present embodiment, the travel speed known in the art can be achieved during the travelling operation and energy efficiency can be improved by reducing energy loss. When the travel levers are operated in the stroke range over which the travel levers are operated halfway or less to perform the travelling operation, effects from variations in the travel load and changes in the pump delivery pressure can be reduced so that favorable travel operability can be achieved.

When the engine speed is reduced to a low speed to thereby perform fine operation in travel, the rate of flow supplied to the traveling motors 3*d* and 3*e* can be finely adjusted in accordance with the input amount of the travel levers. This eliminates a possible excessive travel speed unexpected by the operator, thus significantly improving travel operability.

Miscellaneous

Various changes in form and detail of the embodiment may be made therein without departing from the spirit and scope of the present invention. For example, in the embodiment, the output pressure of the differential pressure reducing valve 11 (the absolute pressure of the differential pressure between the main pump 2 delivery pressure and the maximum load pressure) is introduced to the pressure receiving portions 28*a* to 28*e* . . . of the pressure compensation valves 7*a* to 7*e* . . . . Alternatively, pressure receiving portions that face the pressure compensation valves 7*a* to 7*e* . . . may be provided and the main pump 2 delivery pressure and the maximum load pressure may be introduced individually to these pressure receiving portions to thereby set the target compensation differential pressure.

The embodiment has been described for a case in which the construction machine is a hydraulic excavator. The present invention can nonetheless be applied to any type of construction machine other than the hydraulic excavator (e.g., a hydraulic crane and a wheel type excavator) and can achieve the same advantageous effects as long as the construction machine includes a travel hydraulic motor.

DESCRIPTION OF REFERENCE CHARACTERS

1 engine (prime mover)
2 variable displacement hydraulic pump (main pump)
3*a* to 3*e* actuator
3*e,* 3*e* travel hydraulic motor
4 control valve
5 hydraulic fluid supply line from main pump
6*a* to 6*e* flow control valve
7*a* to 7*e* pressure compensation valve
9*a* to 9*e* shuttle valve
11 differential pressure reducing valve
12 pump control unit
12*a* horsepower control tilting actuator
12*b* LS control valve
12*c* LS control tilting actuator
13 engine speed sensing valve unit (prime mover speed sensing valve unit)
14 main relief valve
15 unloading valve
24 gate lock lever
30 pilot pump
31*a* hydraulic fluid supply line
31*b* pilot hydraulic line
31*c* pilot hydraulic supply line upstream of gate lock selector valve
32 pilot relief valve
33 pilot hydraulic fluid source
50 flow sensing valve
51 differential pressure reducing valve
60*a* to 60*e* control lever unit (operating unit)
60*d,* 60*e* travel control lever unit (operating unit)
70*a* to 70*c* shuttle valve (traveling detecting unit)
71 signal hydraulic line
80 variable restrictor valve
80*a* spring
80*b* pressure receiving portion
100 gate lock valve

The invention claimed is:

1. A hydraulic drive system for a construction machine, the system comprising:

a variable displacement main pump driven by a prime mover;

a plurality of actuators including travel hydraulic motors and driven by a hydraulic fluid delivered from the main pump;

a plurality of flow control valves including travel flow control valves, that controls flow rates of a hydraulic fluid supplied from the main pump to the plurality of actuators;

a plurality of operating units including travel operating units, that instructs operating directions and operating speeds of the plurality of the actuators and outputs commands for operating the plurality of flow control valves;

a plurality of pressure compensation valves for controlling differential pressures across the plurality of flow control valves; and a pump control unit for performing load sensing control of a displacement of the main pump such that a delivery pressure of the main pump becomes higher by a target differential pressure than a maximum load pressure of the actuators, the plurality of pressure compensation valves being configured to control the differential pressures across the respective flow control valves such that the differential pressure across each of the flow control valves is maintained at a differential pressure between the delivery pressure of the main pump and the maximum load pressure of the actuators, wherein the hydraulic drive system further comprises:

a travel detection unit that detects travelling operation in which the travel hydraulic motors are driven; and a target differential pressure setting unit that, based on a result of detection by the travel detection unit, sets the target differential pressure of load sensing control at a first specified value at any time other than the travelling operation and sets the target differential pressure of load sensing control at a second specified value smaller than the first specified value during the travelling operation, wherein the travel flow control valves each has such an opening area characteristic that an opening area at a spool stroke when the corresponding travel operating unit is fully operated is large enough to obtain a predetermined flow rate required for traveling when the target differential pressure of load sensing control is set at the second specified value, and an opening area in a spool stroke range when the corresponding travel operating unit is finely operated is approximate to an opening area of a travel flow control valve having a maximum opening area that can obtain a predetermined flow rate required for traveling when the target differential pressure of load sensing control is set at the first specified value.

2. The hydraulic drive system for a construction machine according to claim 1, wherein the target differential pressure setting unit comprises:

a pilot pump driven by the prime mover;

a prime mover speed sensing valve unit including: a flow sensing valve disposed in a line through which a hydraulic fluid delivered from the pilot pump flows, for varying a differential pressure across the flow sensing valve in accordance with a delivery flow rate of the pilot pump; and a differential pressure reducing valve that generates the differential pressure across the flow sensing valve as an absolute pressure and outputs the absolute pressure as the target differential pressure of load sensing control; and a variable restrictor valve disposed in parallel with the flow sensing valve in a line through which the hydraulic fluid delivered from the pilot pump flows, wherein the variable restrictor valve is in a fully closed position at any time other than the travelling operation and is in a restricting position during the travelling operation and continuously increases an opening area thereof from a full closure up to a maximum as an input amount of the travel operating unit increases from a minimum to a maximum.

* * * * *